(12) United States Patent
Okawa

(10) Patent No.: US 7,573,506 B2
(45) Date of Patent: Aug. 11, 2009

(54) IMAGING DEVICE-EVALUATION METHOD, AN IMAGE CORRECTING METHOD AND AN IMAGEING DEVICE

(75) Inventor: Kaneyasu Okawa, Tsukui-gun (JP)

(73) Assignee: Olympus Corporation, Tokyo (JP)

( * ) Notice: Subject to any disclaimer, the term of this patent is extended or adjusted under 35 U.S.C. 154(b) by 586 days.

(21) Appl. No.: 11/244,617

(22) Filed: Oct. 6, 2005

(65) Prior Publication Data

US 2006/0039625 A1 Feb. 23, 2006

Related U.S. Application Data

(63) Continuation of application No. PCT/JP2004/005157, filed on Apr. 9, 2004.

(30) Foreign Application Priority Data

Apr. 10, 2003 (JP) .............................. 2003-106978

(51) Int. Cl.
*H04N 9/73* (2006.01)
*H04N 5/228* (2006.01)
*H04N 5/235* (2006.01)
*G06K 9/40* (2006.01)

(52) U.S. Cl. ................. 348/223.1; 382/274; 348/221.1; 348/222.1

(58) Field of Classification Search ................ 348/189, 348/222.1, 223.1, 383; 382/274
See application file for complete search history.

(56) References Cited

U.S. PATENT DOCUMENTS

| 5,828,793 | A | | 10/1998 | Mann |
| 5,955,725 | A | * | 9/1999 | Cattorini ................... 250/208.1 |
| 6,760,471 | B1 | * | 7/2004 | Raymond .................... 382/147 |
| 2001/0012331 | A1 | * | 8/2001 | Conrads et al. ............. 378/98.7 |
| 2003/0007077 | A1 | | 1/2003 | Maggi |
| 2004/0085477 | A1 | * | 5/2004 | Majumder et al. .......... 348/383 |

FOREIGN PATENT DOCUMENTS

| JP | 06-233333 | 8/1994 |
| JP | 2001-346218 | 12/2001 |
| JP | 2002-84455 | 3/2002 |

OTHER PUBLICATIONS

Mitsunaga et al., "Radiometric Self Calibration", Proceedings 1999 IEEE Computer Society Conference on Computer Vision and Pattern Recognition (1999), pp. 374-380.

* cited by examiner

*Primary Examiner*—Lin Ye
*Assistant Examiner*—Chia-Wei A Chen
(74) *Attorney, Agent, or Firm*—Scully, Scott, Murphy & Presser, P.C.

(57) ABSTRACT

An imaging apparatus evaluation method of the present invention comprises obtaining an output function of original image data by comparing a plurality of sets of image data which are obtained by imaging the same spatial brightness distribution surface with different exposure times.

10 Claims, 11 Drawing Sheets

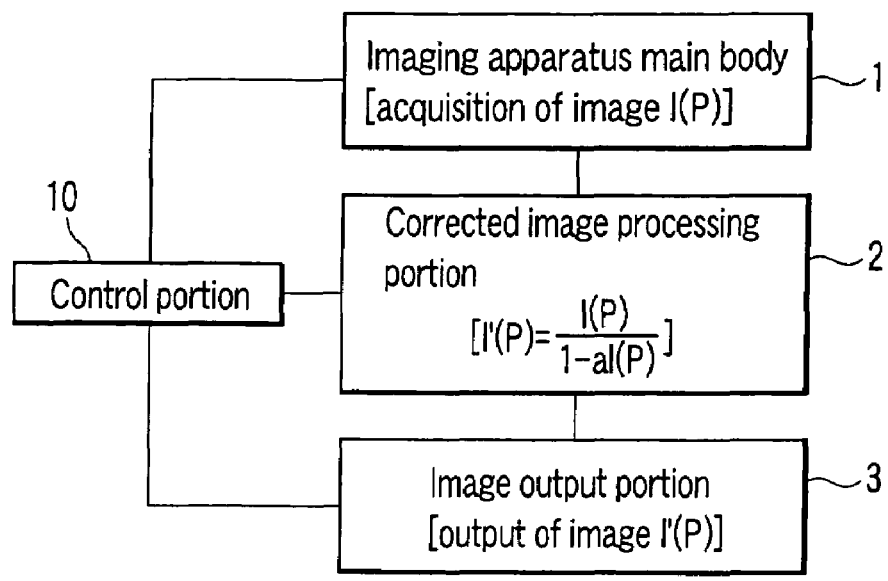
F I G. 1
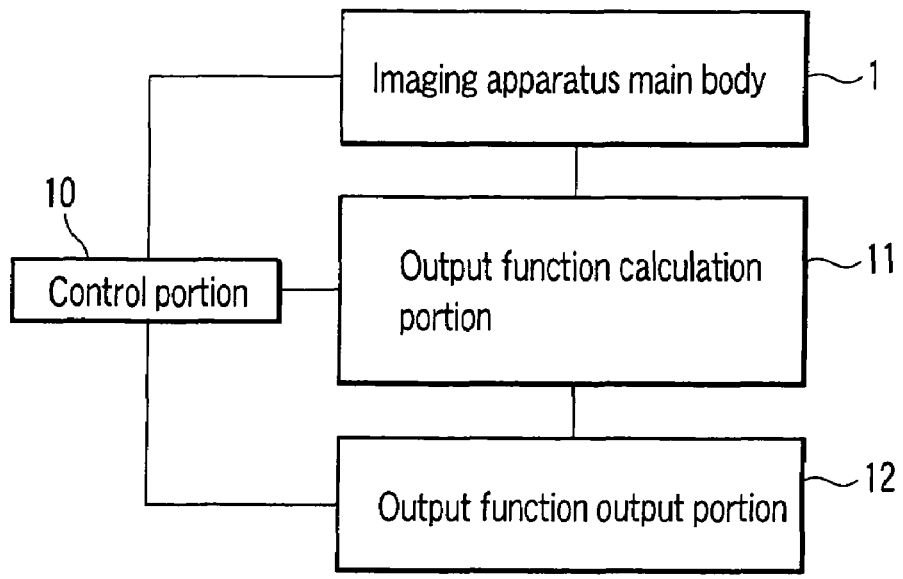
F I G. 2

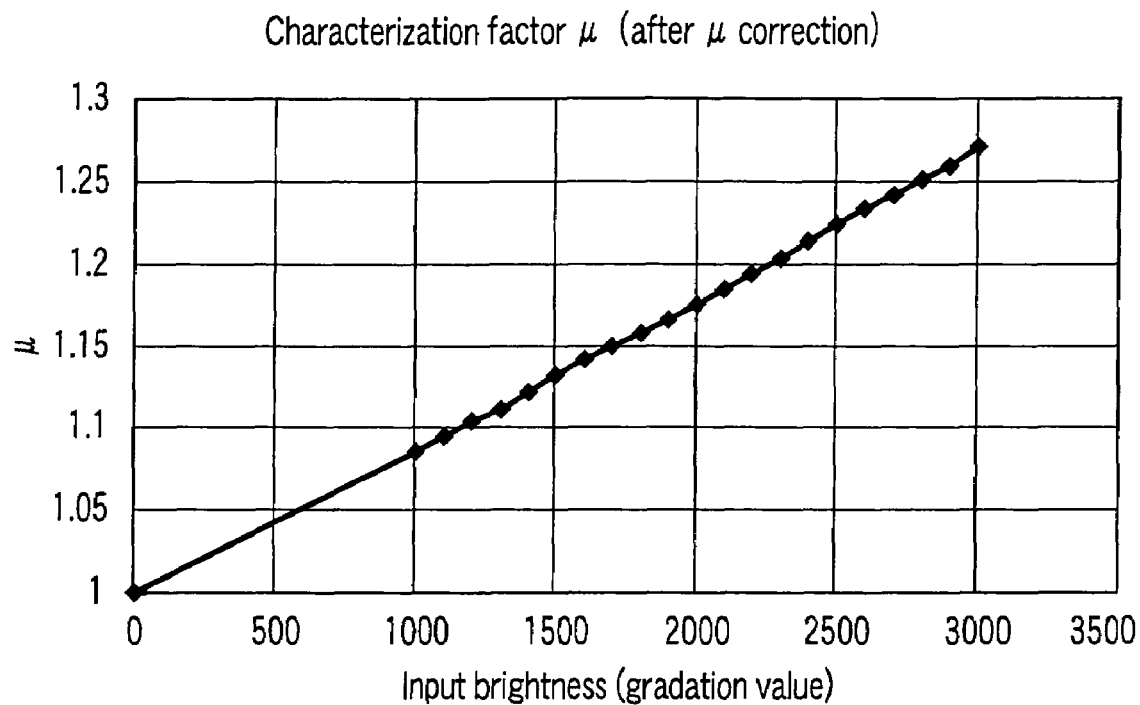
F I G. 7A
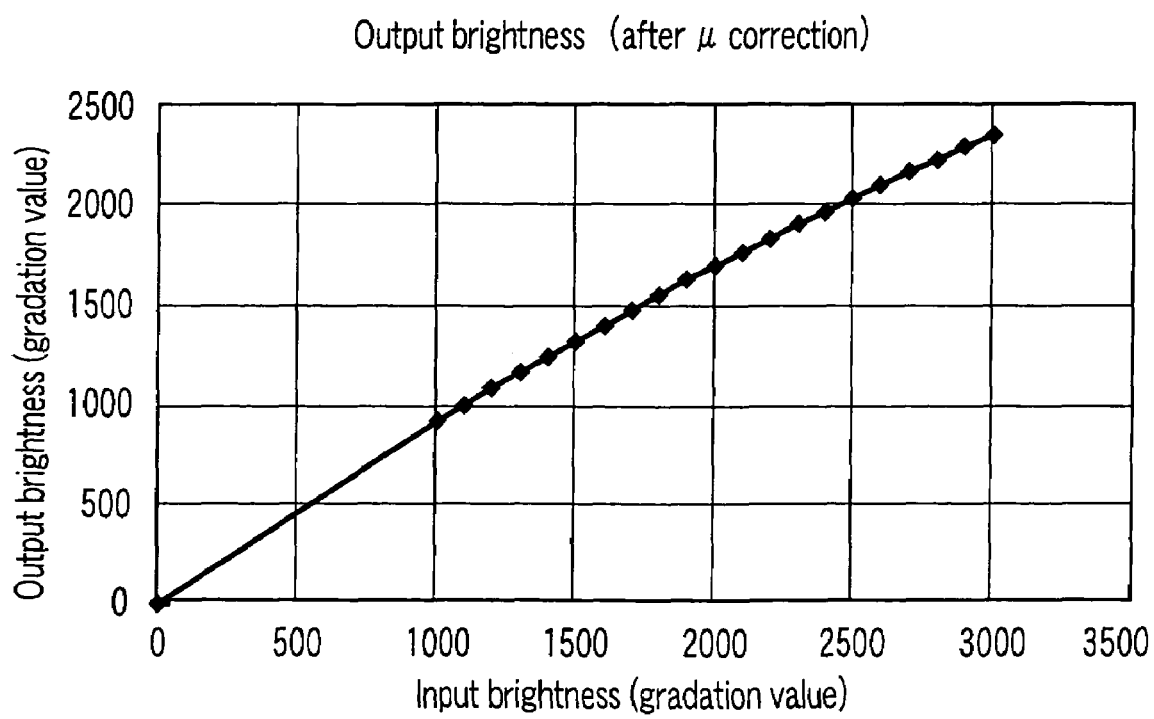
F I G. 7B

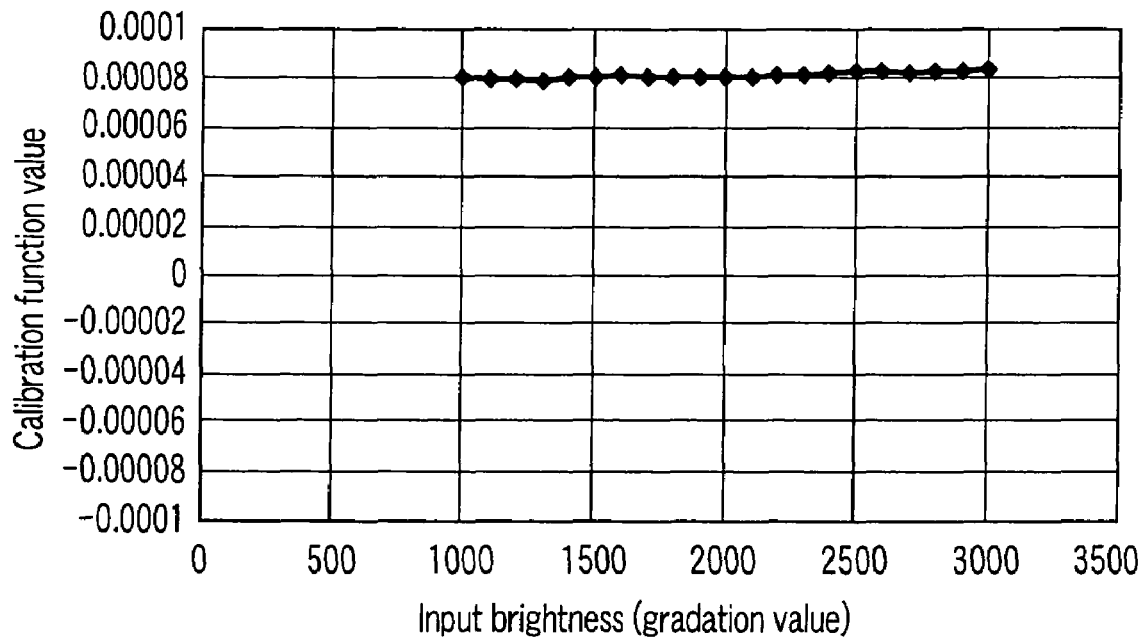
F I G. 11
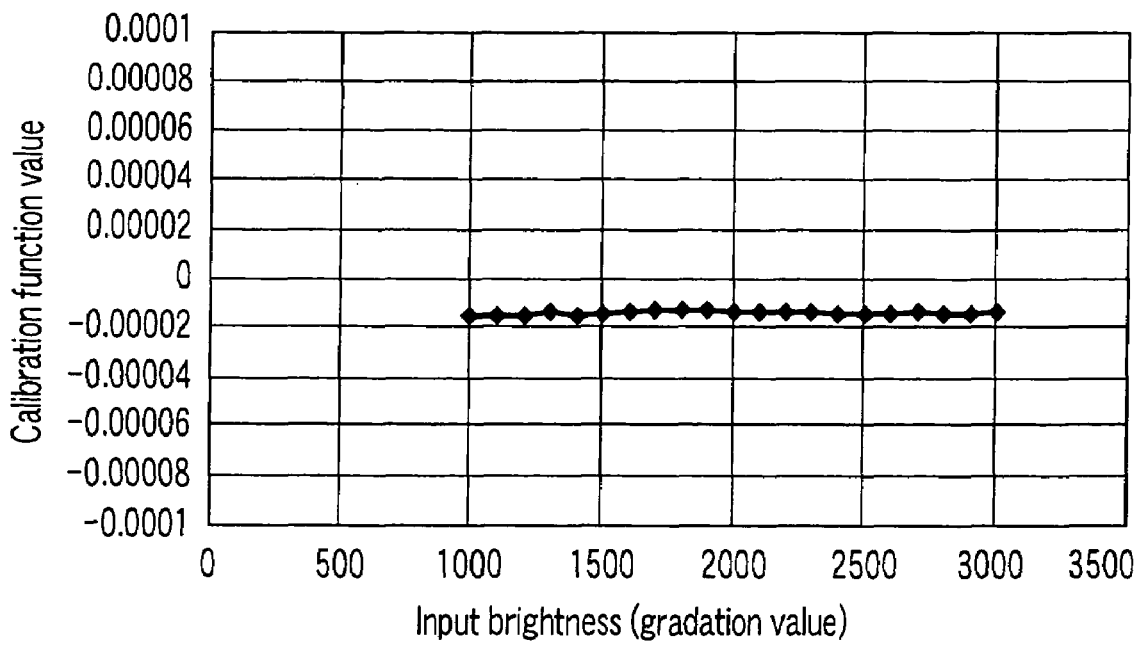
F I G. 12

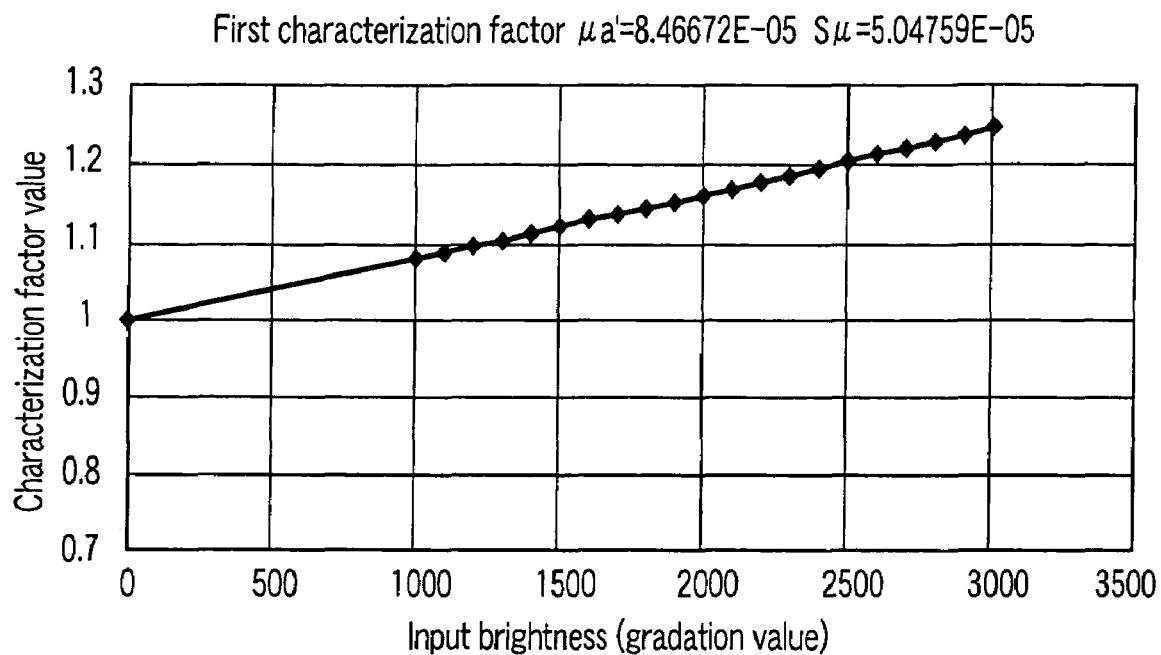
F I G. 15
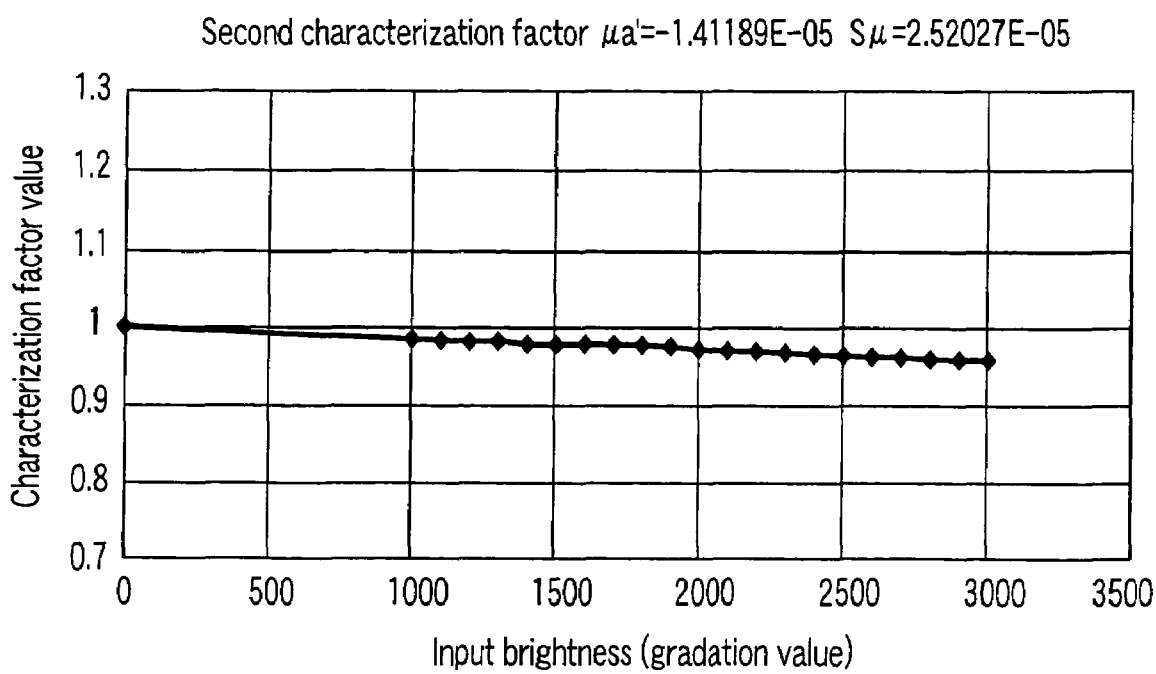
F I G. 16

IMAGING DEVICE-EVALUATION METHOD, AN IMAGE CORRECTING METHOD AND AN IMAGEING DEVICE

CROSS-REFERENCE TO RELATED APPLICATIONS

This is a Continuation Application of PCT Application No. PCT/JP2004/005157, filed Apr. 9, 2004, which was published under PCT Article 21(2) in English.

This application is based upon and claims the benefit of priority from prior Japanese Patent Application No. 2003-106978, filed Apr. 10, 2003, the entire contents of which are incorporated herein by reference.

BACKGROUND OF THE INVENTION

1. Field of the Invention

The present invention relates to an imaging apparatus evaluation method, an image correction method, and an imaging apparatus.

2. Description of the Related Art

Imaging apparatuses such as a video camera or a digital camera are in heavy usage in general photography, and an output correction such as a dynamic range correction, a visual sensitivity correction or a γ correction is applied to many such imaging apparatuses since a high value is attached to visual characteristics. Therefore, many imaging apparatuses cannot obtain images which correctly reflect the object surface brightness.

On the other hand, in imaging apparatuses utilized in some of measurement fields, arrangements are made so that images which correctly reflect the object surface brightness can be obtained. A calibration technique disclosed in Jpn. Pat. Appln. KOKAI No. 6-233333 is one of such techniques.

However, in an imaging apparatus using this calibration technique, a standard light emitting surface is essential. This standard light emitting surface is required for photography every time, quality management is troublesome, and deterioration occurs. Therefore, in this type of imaging apparatus, it cannot be said that an evaluation accuracy of output characteristics and a calibration accuracy of images are enough.

BRIEF SUMMARY OF THE INVENTION

It is a first object of the present invention to provide an imaging apparatus evaluation method which correctly evaluates output characteristics of an imaging apparatus without preparing an object surface having a known brightness distribution.

It is a second object of the present invention to provide an image correction method which obtains an image which correctly reflects an object surface brightness as a corrected image without preparing an object surface having a known brightness distribution.

It is a third object of the present invention to provide an imaging apparatus which can obtain an image which correctly reflects an object surface brightness without preparing an object surface having a known brightness distribution.

According to the present invention, there is provided an imaging apparatus evaluation method comprising: obtaining an output function of original image data by comparing a plurality of sets of image data which are obtained by imaging the same spatial brightness distribution surface with different exposure times.

According to the present invention, there is provided an image correction method comprising: obtaining corrected image data by comparing a plurality of sets of image data obtained by imaging the same spatial brightness distribution surface with different exposure times.

According to the present invention, there is provided an image correction method comprising: determining a as a calibration factor and obtaining corrected image data I'(P) relative to original image data I(P) as the following expression:

$$I'(P) = \frac{I(P)}{1 - aI(P)}$$

According to the present invention, there is provided an imaging apparatus having a processing portion which obtains corrected image data by comparing a plurality of sets of image data obtained by imaging the same spatial brightness distribution surface with different exposure times.

According to the present invention, there is provided an imaging apparatus having a processing portion which determines a is a calibration factor and obtains corrected image data I'(P) as the following expression with respect to original image data I(P):

$$I'(P) = \frac{I(P)}{1 - aI(P)}$$

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram of a first imaging apparatus according to an embodiment of the present invention;

FIG. 2 is a block diagram of an imaging apparatus evaluation apparatus according to the embodiment of the present invention;

FIGS. 7A and 7B are a view showing a characterization factor μ relative to an input brightness after μ correction and a view showing an output brightness relative to the input brightness according to the embodiment of the present invention;

FIG. 11 is a view showing a calibration factor value relative to a first input brightness according to the embodiment of the present invention;

FIG. 12 is a view showing a calibration factor value relative to a second input brightness according to the embodiment of the present invention;

FIG. 15 is a view showing a characterization factor value relative to a first input brightness according to the embodiment of the present invention;

FIG. 16 is a view showing a characterization factor value relative to a second input brightness according to the embodiment of the present invention.

DETAILED DESCRIPTION OF THE INVENTION

Figure 3:
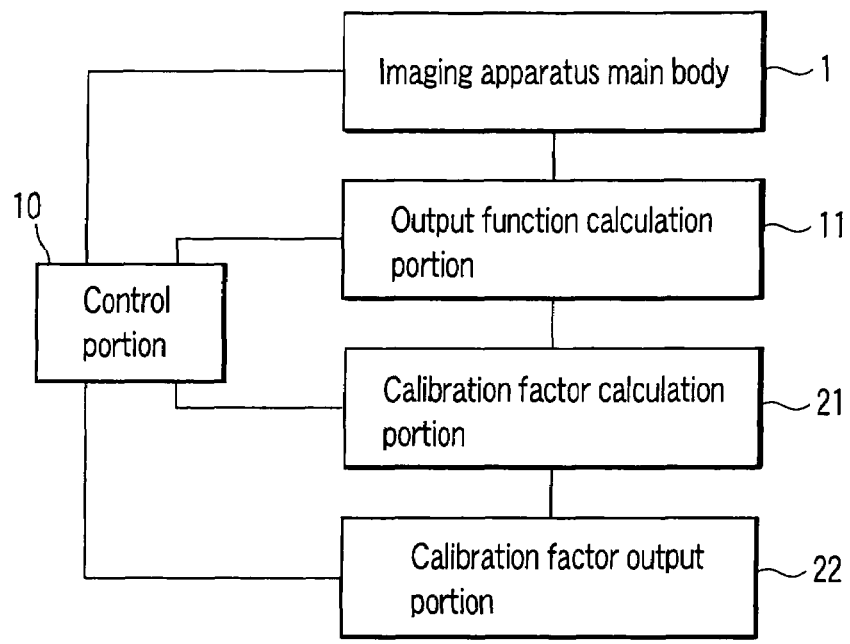
FIG. 3 is a block diagram of a calibration factor acquisition device according to the embodiment of the present invention.

Embodiments according to the present invention will now be described hereinafter with reference to the accompanying drawings.

FIG. 1 is a block diagram of a first imaging apparatus according to an embodiment of the present invention. In FIG. 1, a corrected image processing portion 2 is connected to an imaging apparatus main body 1, and an image output portion 3 is connected to the corrected image processing portion 2. A control portion 10 is connected to the imaging apparatus main body 1, the corrected image processing portion 2 and the image output portion 3. The imaging apparatus main body 1 comprises an imaging element such as a CCD. The corrected image processing portion 2 comprises a computer. The image output portion 3 comprises a memory device. The control portion 10 comprises a CPU.

The imaging apparatus main body 1 acquires image data I(P). The corrected image processing portion 2 receives the image data I(P), and calculates the following expression, as will be described later.

$$I'(P) = \frac{I(P)}{1 - aI(P)}$$

The image output portion 3 receives the image data I'(P), stores it and appropriately outputs it.

FIG. 2 is a block diagram of an imaging apparatus evaluation apparatus according to an embodiment of the present invention. In FIG. 2, like reference numerals denote parts equivalent to those in FIG. 1. In FIG. 2, an output function calculation portion 11 is connected to an imaging apparatus main body 1, and an output function output portion 12 is connected to the output function calculation portion 11. A control portion 10 is connected to the imaging apparatus main body 1, the output function calculation portion 11 and the output function output portion 12.

FIG. 3 is a block diagram of a calibration factor acquisition device according to an embodiment of the present invention. In FIG. 3, like reference numerals denote parts equivalent to those in FIGS. 1 and 2. In FIG. 3, an output function calculation portion 11 is connected to an imaging apparatus main body 1, a calibration factor calculation portion 21 is connected to the output function calculation portion 11, and a calibration factor output portion 22 is connected to the calibration factor calculation portion 21. A control portion 10 is connected to the imaging apparatus main body 1, the output function calculation portion 11, the calibration factor calculation portion 21 and the calibration factor output portion 22.

Figure 4:
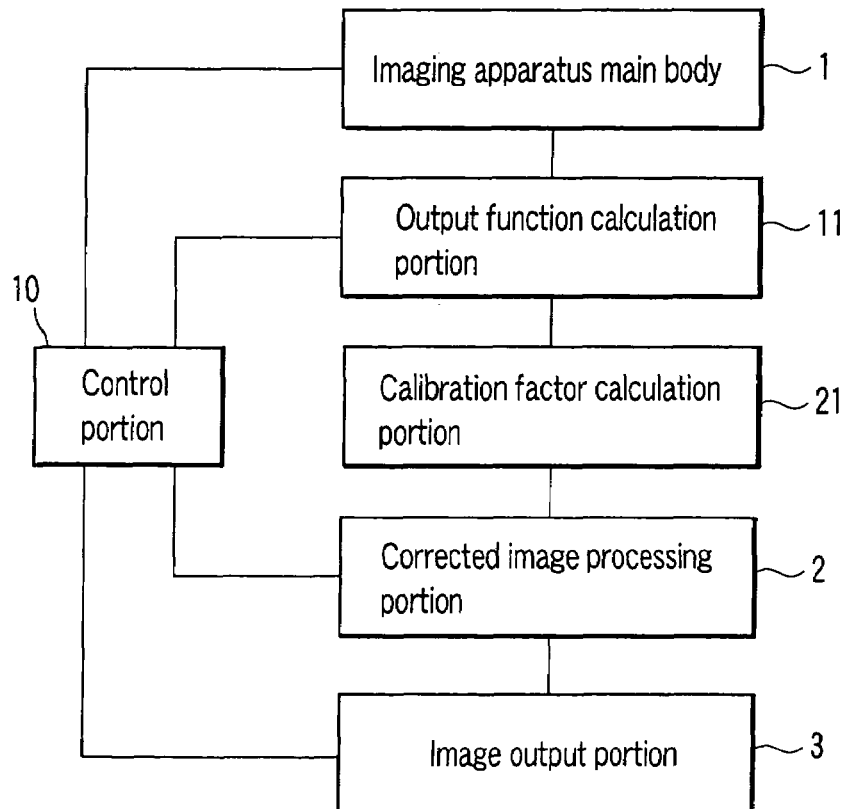
FIG. 4 is a block diagram of a second imaging apparatus according to the embodiment of the present invention.

FIG. 4 is a block diagram of a second imaging apparatus according to an embodiment of the present invention. In FIG. 4, like reference numerals denote parts equivalent to those in FIG. 1, FIG. 2 and FIG. 3. In FIG. 4, an output function calculation portion 11 is connected to an imaging apparatus main body 1, a calibration factor calculation portion 21 is connected to the output function calculation portion 11, a corrected image processing portion 2 is connected to the calibration factor calculation portion 21, and an image output portion 3 is connected to the corrected image processing portion 2. A control portion 10 is connected to the imaging apparatus main body 1, the output function calculation portion 11, the calibration factor calculation portion 21, the corrected image processing portion 2 and the image output portion 3.

Effects of this embodiment will now be described hereinafter.

Now, it is assumed that first image data is obtained by imaging a spatial brightness distribution surface with a given exposure time and second image data is obtained by imaging the same spatial brightness distribution surface with an exposure time which is k-fold of that of the first image data by using a digital imaging apparatus formed of an imaging apparatus main body 1, wherein an output function of original image data is f(P). This spatial brightness distribution surface may be an object surface dedicated to acquire the later-described output function f(P) and acquire a calibration factor a or it may be an actual object for photography. If the object surface is an actual object, it is sufficient for the imaging apparatus to have the structure shown in FIG. 4, an image picked up with an adequate exposure is determined as an object image, and an image picked up with an exposure time which is k-fold of this adequate exposure is determined as a calibration image used to acquire the calibration factor a. It is to be noted that this calibration image is no longer necessary after the calibration factor a is acquired, and hence it is desirable to delete this calibration image in order to save a space in a memory device.

Object point brightnesses on the spatial brightness distribution surface are determined as $P_0, P_1, P_2, P_3, \ldots, P_n, \ldots$ in ascending order, and an exposure sensitivity $R_n$ is defined by using the following expression:

$$R_{n-1} = \frac{f(kP_{n-1})}{kf(P_{n-1})} \quad (1)$$

Here, $f(P_n)$ and $f(kP_n)$ are output brightnesses of the first image data and the second image data corresponding to each object point brightness $P_n$, respectively. That is, the exposure sensitivity $R_n$ becomes 1 irrespective of k when the output function f(P) is in proportion to the object point brightness P. However, when it is not proportion to the same, the exposure sensitivity becomes an increasing function or a decreasing function in accordance with the output function f(P). Further, if $P_n-P_{n-1}$ is small, the following expression can be achieved approximately:

$$f(kP_{n-1}) = f(P_{n-1}) + \frac{f(P_n) - f(P_{n-1})}{P_n - P_{n-1}}(kP_{n-1} - P_{n-1}) \quad (2)$$

The following expression can be obtained based on the expression (1) and the expression (2):

$$f(P_n) = \frac{kP_{n-1} - P_n + kR_{n-1}(P_n - P_{n-1})}{(k-1)P_{n-1}} f(P_{n-1}) \quad (3)$$

However, in case of $P_0' \neq 0$, since it can be considered that a value of the output function is equal to the object point brightness, the following expression can be achieved:

$$f(P_0) = P_0 \quad (4)$$

A data string $f(P_1), f(P_2), f(P_3), \ldots, f(P_n), \ldots$ corresponding to $P_1, P_2, P_3, \ldots, P_n, \ldots$ can be obtained by using the expression (1), the expression (3) and the expression (4), and forming a function of this data string results in the output function $f(P)$ of the original image data. Furthermore, assuming that an output function after calibration is $g(P)$ and a calibration function is $A(P)$, the following expression can be achieved approximately:

$$\frac{g(P)}{f(P)} = A(P)g(P) + 1 \quad (5)$$

Here, if $g(P)=P$, i.e., if the output function $g(P)$ after calibration satisfies conditions which correctly reflect the object point brightness, the following expression can be achieved based on the expression (5):

$$A(P) = \frac{1}{f(P)} - \frac{1}{P} \quad (6)$$

Using the expression (6) can calculate the calibration factor $A(P)$ used for the output function $g(P)$ after calibration to correctly reflect the object point brightness. Now, when an average value of the calibration factor $A(P)$ is defined as the calibration factor a and $A(P)$ in the expression (5) is substituted with a, the following expression can be obtained:

$$g(P) = \frac{f(P)}{1 - af(P)} \quad (7)$$

When the right-side member of the expression (7) is substituted with the output function $f(P)$ of the original image data and the calibration factor a, the output function $g(P)$ after calibration which is substantially equal to P can be obtained.

Since the output function $f(P)$ of the original image data remains the same in the same imaging apparatus irrespective of types of the spatial brightness distribution surface, corrected image data $I'(P)$ obtained based on the expression (7) correctly reflects the object point brightness irrespective of types of the original image data $I(P)$. Therefore, when the corrected image data $I'(P)$ is represented by using the original image data $I(P)$ and the calibration factor a, the following expression can be attained:

$$I'(P) = \frac{I(P)}{1 - aI(P)} \quad (8)$$

Figure 5:
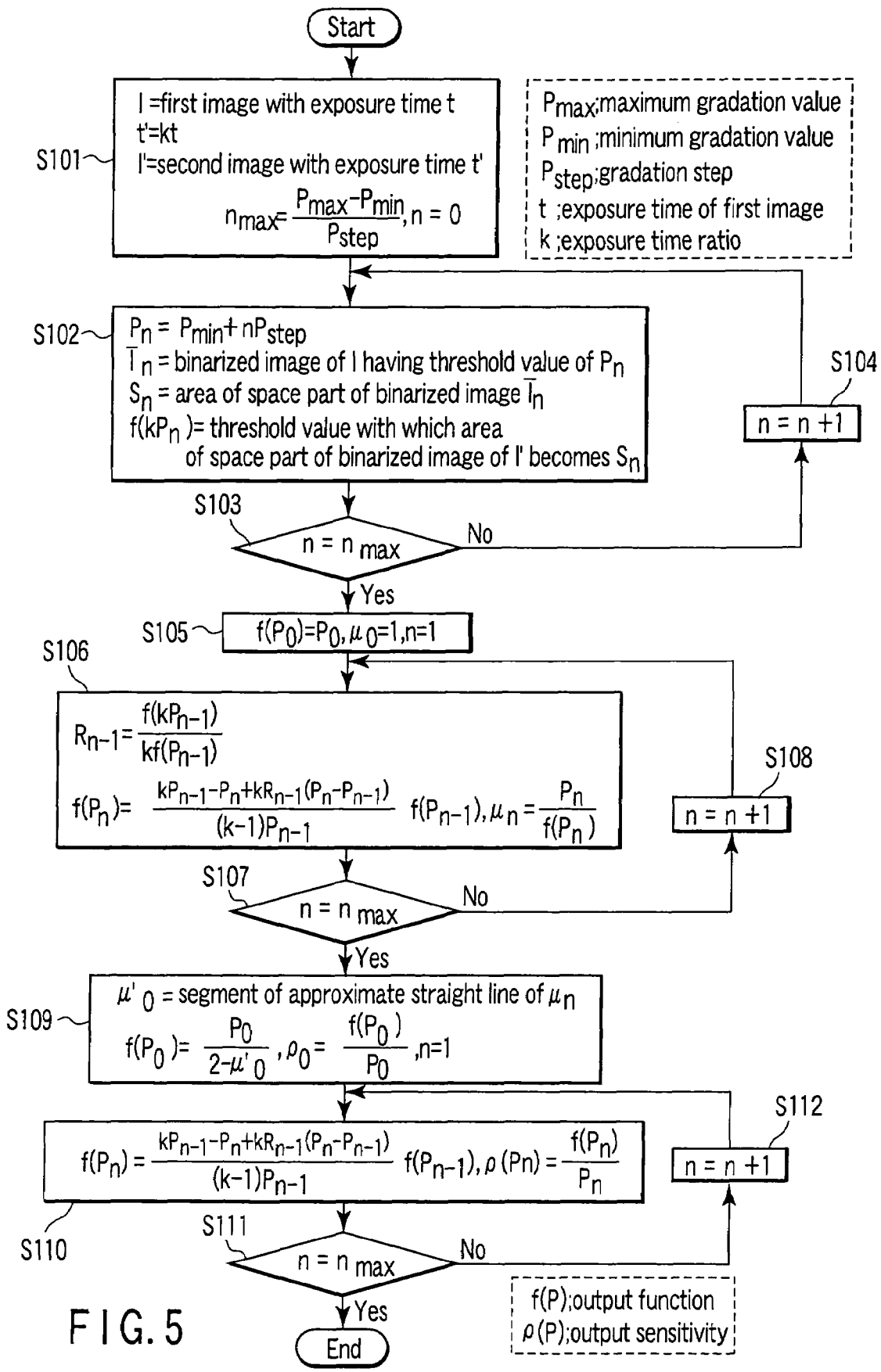
FIG. 5 is a flowchart showing an evaluation processing procedure of the imaging apparatus according to the embodiment of the present invention.

FIG. 5 is a flowchart showing an evaluation processing procedure of an imaging apparatus according to this embodiment. This processing is executed under the control of the control portion 10 in the apparatus depicted in FIG. 2. Incidentally, it is assumed that $P_{max}$ is a maximum gradation value; $P_{min}$, a minimum gradation value; $P_{step}$, a gradation step; t, an exposure time of the first image data; and k, an exposure time ratio in the following description.

At step S101, the imaging apparatus main body 1 acquires first image data I with an exposure time t. The output function calculation portion 11 determines t'=kt. The imaging apparatus main body 1 acquires second image data I' with an exposure time t'. The output function calculation portion 11 calculates $n_{max}=(P_{max}-P_{min})/P_{step}$, and determines n=0.

At step S102, the output function calculation portion 11 calculates $P_n=P_{min}+nP_{step}$. The output function calculation portion 11 acquires binarized image data of the first image data I having a threshold value of $P_n$, the binary image data being represented by the following expression:

$$\bar{I}_n$$

The output function calculation portion 11 acquires an area $S_n$ of a space part of the binarized image data represented by the following expression:

$$\bar{I}_n$$

Moreover, it acquires a threshold value $f(kP_n)$ with which an area of the space part of the binarized image data represented by the following expression becomes $S_n$:

$$\bar{I}_n$$

If $n=n_{max}$ is not achieved at step S103, the output function calculation portion 11 determines n=n+1 at step S104, and returns to step S102. If $n=n_{max}$ is achieved at step S103, the output function calculation portion 11 determines $f(P_0)=P_0$, $\mu_0=1$ and n=1 at step S105.

At step S106, the output function calculation portion 11 calculates the following expression:

$$R_{n-1} = \frac{f(kP_{n-1})}{kf(P_{n-1})}$$

$$f(P_n) = \frac{kP_{n-1} - P_n + kR_{n-1}(P_n - P_{n-1})}{(k-1)P_{n-1}} f(P_{n-1}), \mu_n = \frac{P_n}{f(P_n)}$$

If $n=n_{max}$ is not achieved at step S107, the output function calculation portion 11 determines n=n+1 at step S108, and returns to step S106. It is to be noted that a characterization factor $\mu_n$ is an inverse number of the output sensitivity value, and $f(P_n)$ is an output function.

Figure 6A:
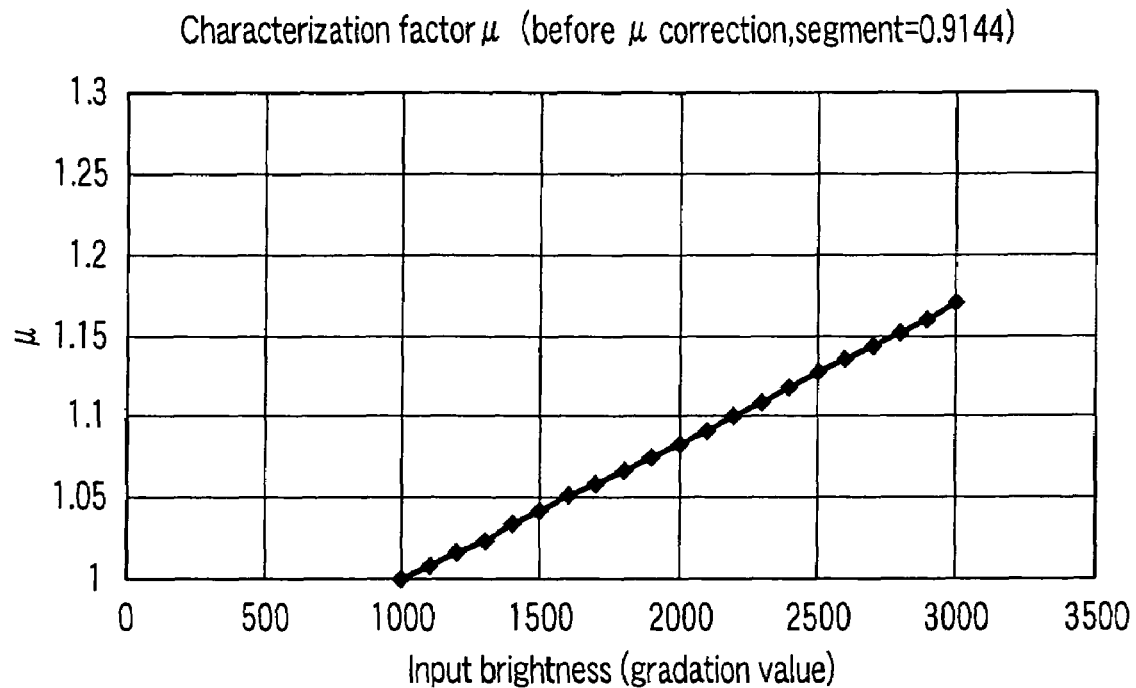
FIGS. 6A and 6B are a view showing a characterization factor μ relative to an input brightness before μ correction and a view showing an output brightness relative to the input brightness according to the embodiment of the present invention.
Figure 6B:
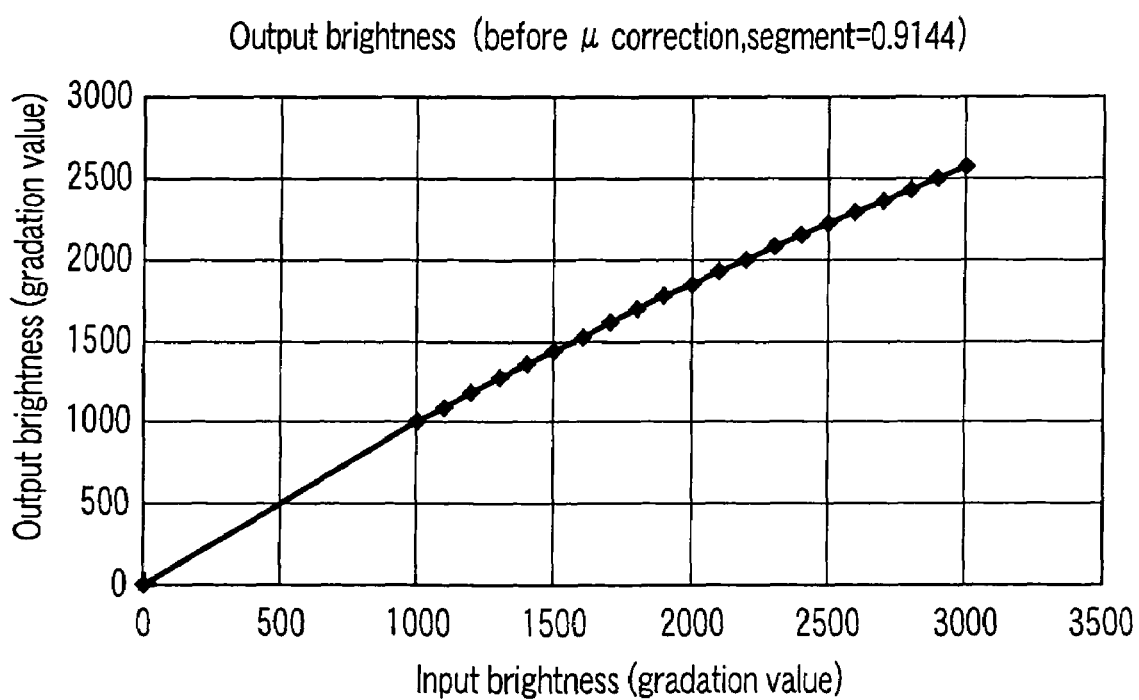

As a result, there can be obtained a graph showing the characterization factor $\mu$ relative to the input brightness such as shown in FIG. 6A and a graph showing an output brightness $f(P)$ relative to the input brightness P, i.e., the output brightness such as shown in FIG. 6B.

If $n=n_{max}$ is achieved at step S107, a segment $\mu_0'$ of an approximate straight line of $\mu_n$ is calculated at step S109. Additionally, the output function calculation portion 11 calculates the following expression by using this $\mu_0'$:

$$f(P_0) = \frac{P_0}{2-\mu_0}, \rho_0 = \frac{f(P_0)}{P_0},$$

As a result, $f(P_0)=P_0$ and $\rho_0=1$ can be obtained. This processing is performed to match the output brightness to the input brightness in the vicinity of the brightness 0 and set the output sensitivity value to 1. Further, the output function calculation portion 11 determines n=1.

At step S110, the output function calculation portion 11 calculates the following expression:

$$f(P_n) = \frac{kP_{n-1} - P_n + kR_{n-1}(P_n - P_{n-1})}{(k-1)P_{n-1}} f(P_{n-1}), \rho(P_n) = \frac{f(P_n)}{P_n}$$

If $n=n_{max}$ is not achieved at step S111, the output function calculation portion 11 determines n=n+1 at step S112, and returns to step S110. It is to be noted that $\rho(P_n)$ is an output sensitivity, and $f(P_n)$ is an output function. If $n=n_{max}$ is achieved at step S111, the output function calculation portion 11 terminates the processing. The output function $f(P_n)$ is stored in the output function output portion 12 comprising a memory device.

As a result, the characterization factor μ is corrected, and there can be obtained a graph showing the characterization factor μ relative to the input brightness such as shown in FIG. 7A and a graph showing the output brightness relative to the input brightness such as shown in FIG. 7B. Furthermore, there is obtained from FIG. 7A a graph showing an output sensitivity value (inverse value of the characterization factor) relative to the input brightness such as shown in FIG. 8.

Figure 8:
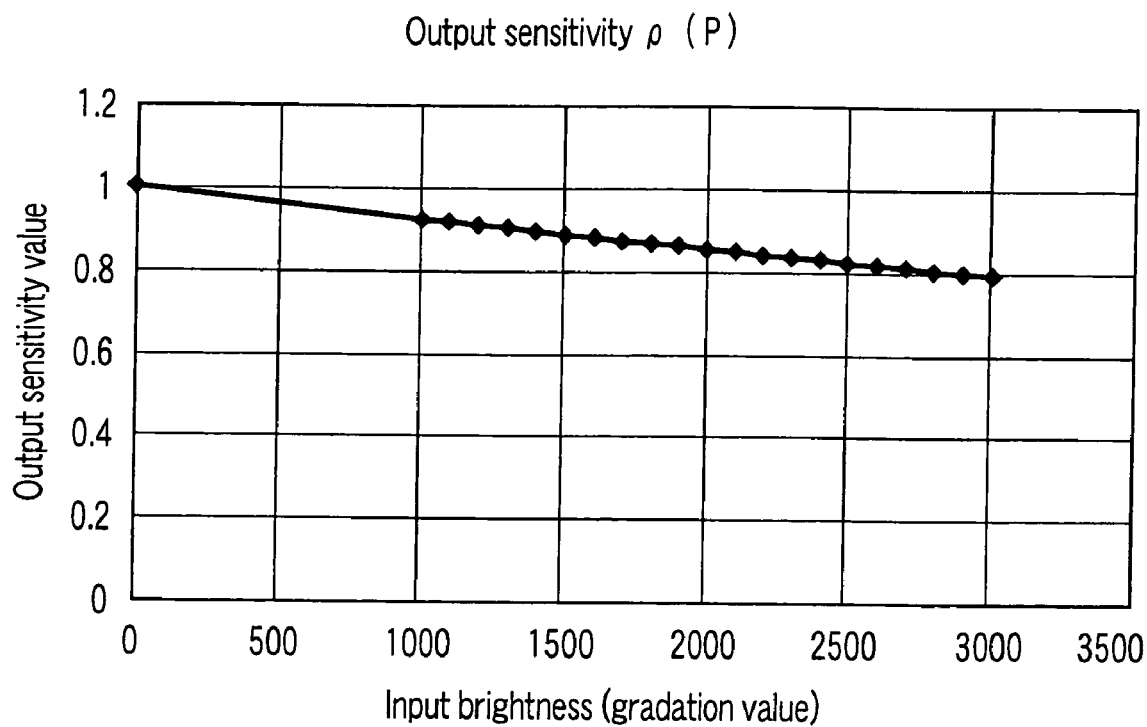
FIG. 8 is a view showing an output sensitivity value (reciprocal of the characterization factor) relative to an input brightness according to the embodiment of the present invention.

If the object point brightness is correctly reflected in the imaging apparatus, the characterization factor is always substantially 1 with respect to a change in the input brightness in the graph of FIG. 7A, the output sensitivity value is always substantially 1 with respect to a change in the input brightness in the graph of FIG. 8, and the input brightness and the output brightness are substantially in proportion to each other in the graph of FIG. 7B. However, as apparent from the evaluation result of FIGS. 7A, 7B and FIG. 8, the object point brightness is not correctly reflected in this imaging apparatus. Then, correction processing is carried out so as to correctly reflect the object point brightness.

Figure 9:
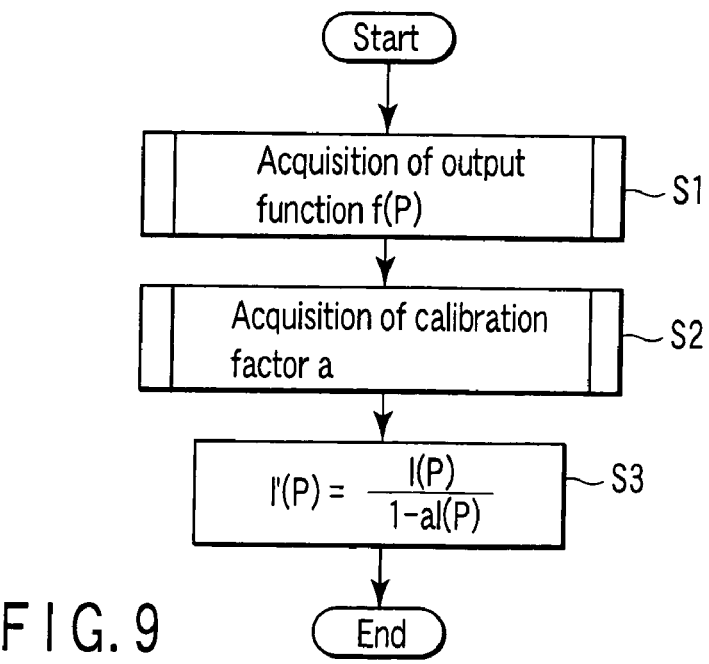
FIG. 9 is a flowchart showing an image correction processing procedure by the imaging apparatus according to the embodiment of the present invention.

FIG. 9 is a flowchart showing an image correction processing procedure performed by the imaging apparatus according to this embodiment. This processing is executed under the control of the control portion 10 in the apparatus shown in FIG. 4.

At step S1, an output function f(P) is acquired by the output function calculation portion 11. At step S2, a calibration factor a is acquired by the calibration factor calculation portion 21. At step S3, the corrected image processing portion 2 calculates the following expression:

$$I'(P) = \frac{I(P)}{1-aI(P)}$$

This corrected image data I'(P) is stored in the image output portion 3.

Figure 10:
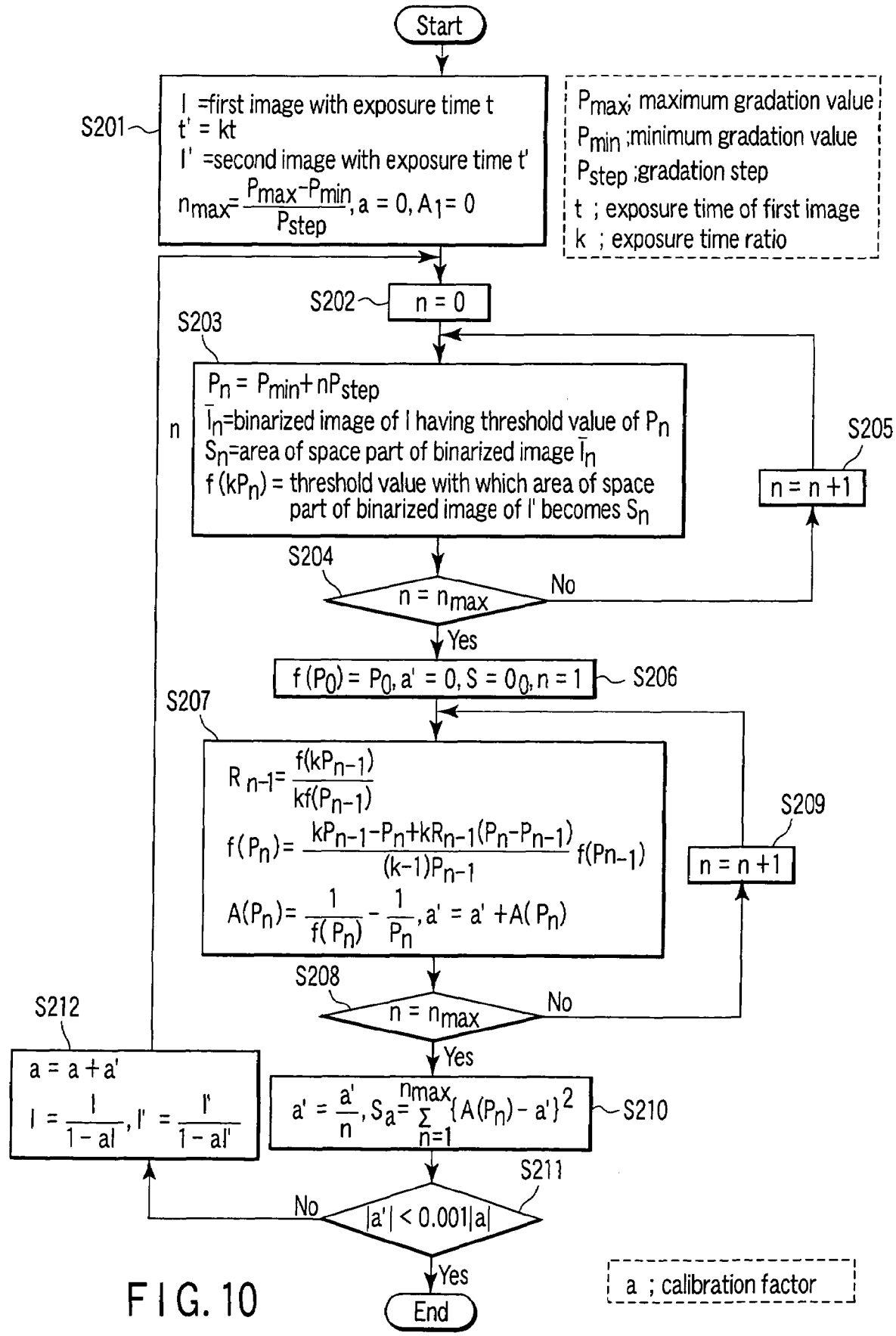
FIG. 10 is a flowchart showing a first calibration factor acquisition processing procedure by the imaging apparatus according to the embodiment of the present invention.

FIG. 10 is a flowchart showing a first calibration factor acquisition processing procedure effected by the imaging apparatus according to this embodiment. This processing corresponds to step S2 in FIG. 9, and it is executed under the control of the control portion 10 in the apparatus shown in FIG. 4. Moreover, this processing can be also executed by the control of the control portion 10 in the apparatus shown in FIG. 3. Incidentally, it is assumed that $P_{max}$ is a maximum gradation value; $P_{min}$, a minimum gradation value; $P_{step}$, a gradation step; t, an exposure time of the first image data; and k, an exposure time ratio in the following description.

At step S201, the imaging apparatus main body 1 acquires first image data I with an exposure time t. The calibration factor calculation portion 21 determines t'=kt. The imaging apparatus main body 1 acquires second image data I' with an exposure time t'. The calibration factor calculation portion 21 calculates $n_{max}=(P_{max}-P_{min})/P_{step}$, and determines a=0 and $A_1=0$.

The calibration factor calculation portion 21 determines n=0 at step S202, and the calibration factor calculation portion 21 calculates $P_n=P_{min}+nP_{step}$ at step S203. The calibration factor calculation portion 21 acquires binarized image data of the first image data I having a threshold value of $P_n$ which is represented by the following expression:

$$\bar{I}_n$$

The calibration factor calculation portion 21 acquires an area $S_n$ of a space part of the binarized image data represented by the following expression:

$$\bar{I}_n$$

Furthermore, it acquires a threshold value $f(kP_n)$ with which an area of the space part of the binarized image data represented by the following expression becomes $S_n$:

$$\bar{I}_n$$

If $n=n_{max}$ is not achieved at step S204, the calibration factor calculation portion 21 determines n=n+1 at step S205, and returns to step S203. If $n=n_{max}$ is achieved at step S204, the calibration factor calculation portion 21 determines $f(P_0)=P_0$, a'=0, $S=0_0$ and n=1 at step S206.

At step S207, the calibration factor calculation portion 21 calculates the following expression:

$$R_{n-1} = \frac{f(kP_{n-1})}{kf(P_{n-1})}$$

$$f(P_n) = \frac{kP_{n-1} - P_n + kR_{n-1}(P_n - P_{n-1})}{(k-1)P_{n-1}} f(P_{n-1})$$

$$A(P_n) = \frac{1}{f(P_n)} - \frac{1}{P_n}, a' = a' + A(P_n)$$

If $n=n_{max}$ is not achieved at step S208, the calibration factor calculation portion 21 determines n=n+1 at step S209, and returns to step S207. If $n=n_{max}$ is achieved at step S208, the calibration factor calculation portion 21 calculates the following expression:

$$a' = \frac{a'}{n}, S_a = \sum_{n=1}^{n_{max}} \{A(P_n) - a'\}^2$$

If |a'|<0.001 |a| is not achieved at step S211, the calibration factor calculation portion 21 calculates a=a+a', I=I/(1−aI) and I'=I'/(1−aI') at step S212. If |a'|<0.001 |a| is achieved at step S211, the calibration factor calculation portion 21 terminates the processing. As a result, an appropriate calibration factor a is obtained. It is to be noted that the calibration factor a is stored in the calibration factor output portion 22 comprising the memory device in the apparatus shown in FIG. 3.

Figure 13:
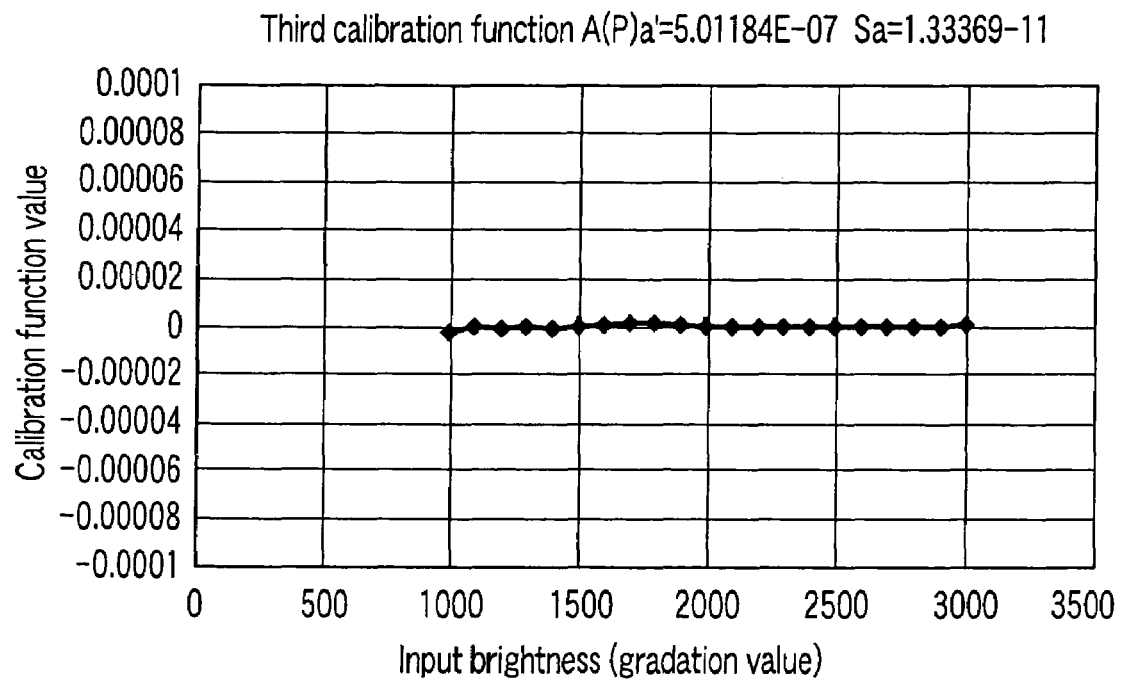
FIG. 13 is a view showing a calibration factor value relative to a third input brightness according to the embodiment of the present invention.

FIG. 11, FIG. 12 and FIG. 13 are graphs showing a first calibration factor A(P), a second calibration factor A(P) and a third calibration factor A(P) respectively obtained by the above-described processing, i.e., calibration function values relative to the input brightnesses. As shown in FIG. 13, a conditional expression of |a'|<0.001 |a| is satisfied based on the third calibration function A(P), the calibration function value is constantly substantially 0 with respect to the input brightness, and a at this time becomes the calibration factor. It is to be noted that a factor in the conditional expression is not restricted to 0.001, and it can be appropriately changed.

Figure 14:
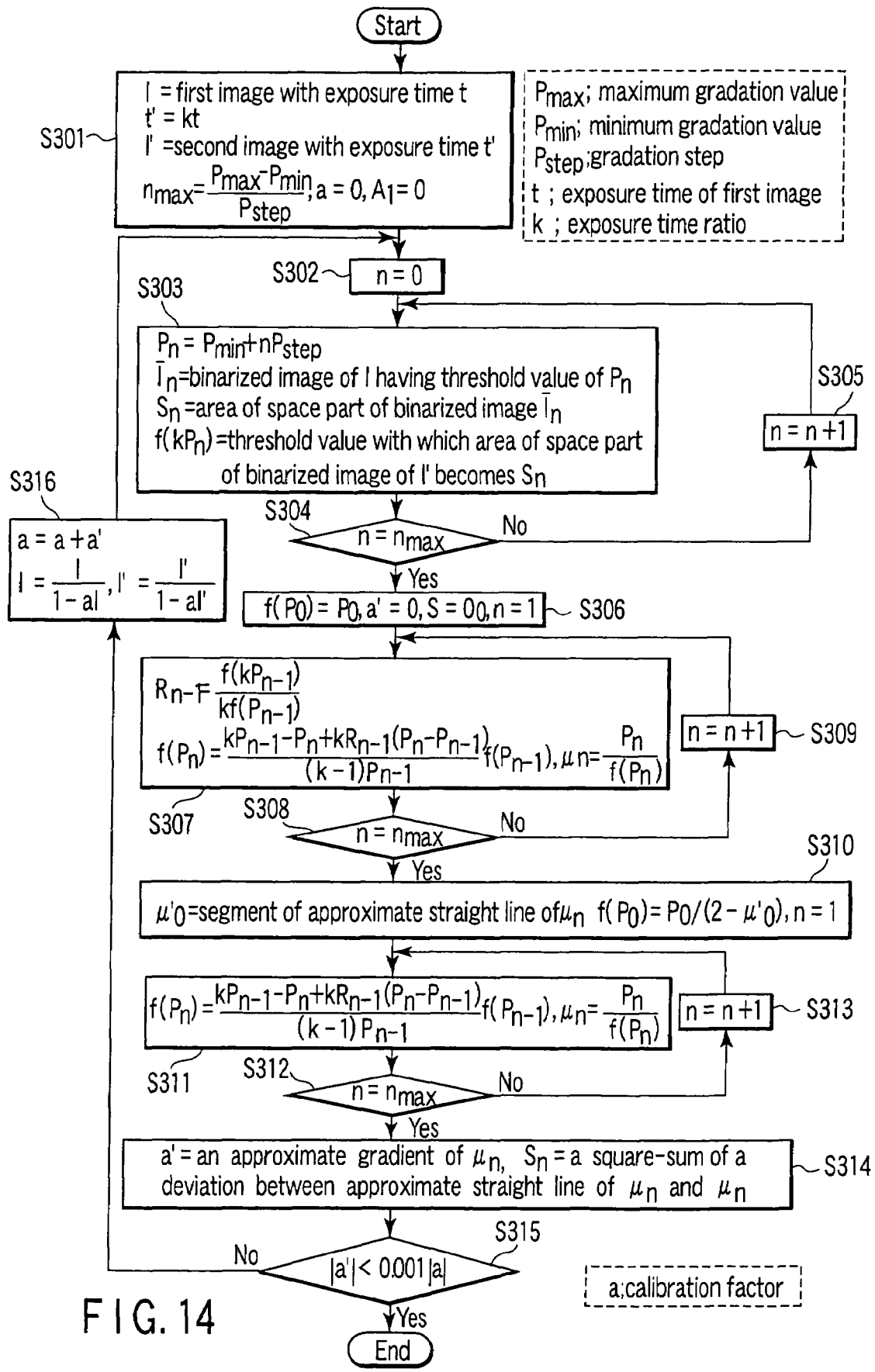
FIG. 14 is a flowchart showing a second calibration factor acquisition processing procedure by the imaging apparatus according to the embodiment of the present invention.

FIG. 14 is a flowchart showing a second calibration factor acquisition processing procedure executed by the imaging apparatus according to this embodiment. This processing corresponds to the step S2 in FIG. 9, and it is executed under the control of the control portion 10 in the apparatus shown in FIG. 4. Moreover, this processing can be also executed under the control of the control portion 10 in the apparatus depicted in FIG. 3. Incidentally, it is assumed that $P_{max}$ is a maximum gradation value; $P_{min}$, a minimum gradation value; $P_{step}$, a gradation step; t, an exposure time of first image data; and k, an exposure time ratio in the following description.

At step S301, the imaging apparatus main body 1 acquires first image data I with an exposure time t. The calibration factor calculation portion 21 determines t'=kt. The imaging apparatus main body 1 acquires second image data I' with an exposure time t'. The calibration factor calculation portion 21 calculates $n_{max}=(P_{max}-P_{min})/P_{step}$, and determines a=0 and $A_1=0$.

The calibration factor calculation portion 21 determines n=0 at step S302, and the calibration factor calculation portion 21 calculates $P_n=P_{min}+nP_{step}$ at step S303. The calibration factor calculation portion 21 acquires binarized image data of first image data I having a threshold value of $P_n$ which is represented by the following expression:

$$\bar{I}_n$$

The calibration factor calculation portion 21 acquires an area $S_n$ of a space part of the binarized image data represented by the following expression:

$$\bar{I}_n$$

Additionally, it acquires a threshold value $f(kP_n)$ with which an area of the space part of the binarized image data represented by the following expression becomes $S_n$:

$$\bar{I}_n$$

If $n=n_{max}$ is not achieved at step S304, the calibration factor calculation portion 21 determines n=n+1 at step S305, and returns to step S303. If $n=n_{max}$ is achieved at a step S304, the calibration factor calculation portion 21 determines $f(P_0)=P_0$, a'=0, $S=0_0$ and n=1 at a step S306.

At step S307, the calibration factor calculation portion 21 calculates the following expression:

$$R_{n-1} = \frac{f(kP_{n-1})}{kf(P_{n-1})}$$

-continued $$f(P_n) = \frac{kP_{n-1} - P_n + kR_{n-1}(P_n - P_{n-1})}{(k-1)P_{n-1}} f(P_{n-1}), \mu_n = \frac{P_n}{f(P_n)}$$

If $n=n_{max}$ is not achieved at step S308, the calibration factor calculation portion 21 determines n=n+1 at step S309, and returns to step S307. If $n=n_{max}$ is achieved at step S308, at step S310, the calibration factor calculation portion 21 calculates a segment of an approximate straight line of $\mu_0'=\mu n$ represented by the following expression in order to obtain a segment $\mu_0=1$ of an approximate straight line of $\mu n$:

$$r(P_0) = \frac{P_0}{2 - \mu_0'}$$

Further, the calibration factor calculation portion 21 determines n=1.

At step S311, the calibration factor calculation portion 21 calculates the following expression:

$$f(P_n) = \frac{kP_{n-1} - P_n + kR_{n-1}(P_n - P_{n-1})}{(k-1)P_{n-1}} f(P_{n-1}), \mu_n = \frac{P_n}{f(P_n)}$$

If $n=n_{max}$ is not achieved at step S312, the calibration factor calculation portion 21 determines n=n+1 at step S313, and returns to step S311. If $n=n_{max}$ is achieved at step S312, the calibration factor calculation portion 21 obtains an approximate gradient a' of the approximate straight line of $\mu_n$ and acquires a square-sum of a deviation between the approximate straight line of $\mu_n$ and $\mu_n$ at step S314. It is to be noted that the second calibration factor acquisition processing is executed for multiple times while changing the exposure time ratio k, and k with which the square-sum of the deviation from the approximate straight line represented by the following expression becomes minimum is used, thereby obtaining a further accurate calibration factor:

$$\mu(P) = \frac{P}{f(P)}$$

If |a'|<0.001 |a| is not achieved at step S315, the calibration factor calculation portion 21 calculates a=a+a', I=I/(1−aI) and I'=I'/(1−aI') at step S316. If |a'|<0.001 |a| is achieved at step S315, the calibration factor calculation portion 21 terminates the processing. As a result, an appropriate calibration factor a can be obtained. It is to be noted that the calibration factor a is stored in the calibration factor output portion 22 in the apparatus shown in FIG. 3.

Figure 17:
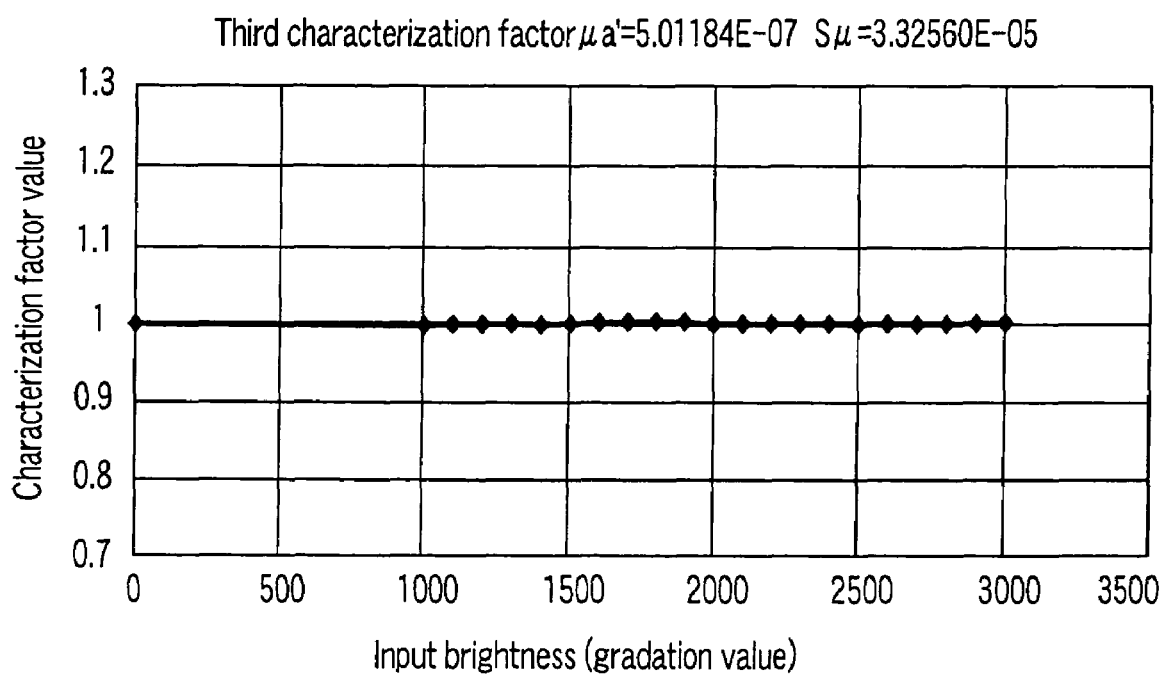
FIG. 17 is a view showing a characterization factor value relative to a third input brightness according to the embodiment of the present invention.

FIG. 15, FIG. 16 and FIG. 17 are graphs showing a first characterization factor μ, a second characterization factor μ and a third characterization factor μ obtained by the above-described processing, i.e., characterization factor values relative to each input brightness. As shown in FIG. 17, the condition of |a'|<0.001 |a| is satisfied based on the third characterization factor, the characterization factor value constantly becomes substantially 1 with respect to a change in the input brightness, and a at this time becomes a calibration factor.

It is to be noted that one of the first calibration factor acquisition processing shown in FIG. 10 and the second calibration factor acquisition processing shown in FIG. 14 is executed in the processing to acquire the calibration factor a at the step S2 in FIG. 9.

Based on the thus obtained calibration factor a, the corrected image processing portion 2 in the apparatus shown in FIG. 4 calculates the following expression at step S3 in FIG. 9:

$$I'(P) = \frac{I(P)}{1 - aI(P)}$$

As a result, corrected image data I'(P) relative to the original image data I(P) can be obtained. This corrected image data I'(P) is stored in the image output portion 3.

By assigning the calibration factor a in the expression (8) in this manner, a corrected image in which an object surface brightness is correctly reflected can be obtained in the subsequent photography using the imaging apparatus. That is, an image which correctly reflects the object surface brightness can be obtained without preparing an object surface having a known brightness distribution at the time of regular photography using the imaging apparatus. It is to be noted that the calibration factor a is calculated as described above at the time of shipment of the imaging apparatus, and it is assigned in the above-described expression of the corrected image processing portion 2.

Therefore, in case of the first imaging apparatus having the structure shown in FIG. 1, just assigning the calibration factor a which is measured by another device in advance in the expression of the corrected image processing portion 2 can perform setting required to obtain a corrected image in which an object surface brightness is correctly reflected.

It is to be noted that the present invention is not restricted to the foregoing embodiments, and it can be modified and carried out in many ways without departing from the scope of the invention.

According to the present invention, there can be provided an imaging apparatus evaluation method which correctly evaluates output characteristics of an imaging apparatus without preparing an object surface having a known brightness distribution.

Furthermore, according to the present invention, there can be provided an image correction method which obtains an image which correctly reflects an object surface brightness as a corrected image without preparing an object surface having a known brightness distribution.

Moreover, according to the present invention, there can be provided an imaging apparatus which can obtain an image which correctly reflects an object surface brightness without preparing an object surface having a known brightness distribution.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An imaging device-evaluation method comprising:
   obtaining by a computer an output function f(P) of original image data by comparing a plurality of pieces of image data obtained by imaging one spatial brightness distribution surface for different exposure times, a ratio k, and an nth object point brightness $P_n$;
   wherein the k is an exposure time ratio, the $P_n$ is an nth object point brightness in ascending order, and $f(P_n)$ is an output brightness of first image data corresponding to the object-point brightness, and $f(kP_n)$ is an output brightness of second image data corresponding to the object point brightness and the output function f(P) of the original image data is obtained based on the following expressions:

$$R_{n-1} = \frac{f(kP_{n-1})}{kf(P_{n-1})}$$

$$f(P_n) = \frac{kP_{n-1} - P_n + kR_{n-1}(P_n - P_{n-1})}{(k-1)P_{n-1}} f(P_{n-1}).$$

2. The imaging device-evaluation method according to claim 1, wherein the output brightness of the first image data has threshold values of $f(P_n)$ and $P_n$ and a threshold value of the second image data is set at $f(kP_n)$ that enables the second image data to have an output brightness area equal to the output brightness area which the first image data has when the first image is greater than the threshold values of $f(P_n)$ and $P_n$.

3. An image correcting method comprising:
   calculating by a computer calibration coefficient a by comparing a plurality of pieces of image data obtained by imaging one spatial brightness distribution surface for different exposure times, and obtaining corrected image data based on calibration coefficient a;
   wherein the corrected image data I'(P) is obtained from the original image data I(P) by use of the following expression:

$$I'(P) = \frac{I(P)}{1 - aI(P)}.$$

4. The image correcting method according to claim 3, wherein k is an exposure time ratio, $P_n$ is the n-th object point brightness in ascending order, and $f(P_n)$ is an output brightness of first image data corresponding to the object point brightness, and $f(kP_n)$ is an output brightness of second image data corresponding to the object point brightness, and an output function f(P) of the original image data is obtained based on the following expression:

$$R_{n-1} = \frac{f(kP_{n-1})}{kf(P_{n-1})}$$

$$f(P_n) = \frac{kP_{n-1} - P_n + kR_{n-1}(P_n - P_{n-1})}{(k-1)P_{n-1}} f(P_{n-1})$$

and a calibration coefficient a is obtained as an average value of the following expression:

$$\frac{1}{f(P)} - \frac{1}{P}$$

5. The image correcting method according to claim 4, wherein the exposure time ratio k is changed such that a sum of squares of a deviation from an average value of the following expression becomes minimum is used:

$$\frac{1}{f(P)} - \frac{1}{P}.$$

6. The image correcting method according to claim 3, wherein k is an exposure time ratio, $P_n$ is the n-th object point brightness in ascending order, $f(P_n)$ is an output brightness of first image data corresponding to the object point brightness, and $f(kP_n)$ is an output brightness of second image data corresponding to the object point, an output function f(P) of the original image data is obtained based on the following expressions:

$$R_{n-1} = \frac{f(kP_{n-1})}{kf(P_{n-1})}$$

$$f(P_n) = \frac{kP_{n-1} - P_n + kR_{n-1}(P_n - P_{n-1})}{(k-1)P_{n-1}} f(P_{n-1})$$

and a calibration coefficient a is obtained as an approximate gradient of the following expression:

$$\mu(P) = \frac{P}{f(P)}.$$

7. The image correcting method according to claim 6, wherein the exposure time ratio k is changed such that the sum of squares of the deviation from an approximate linear line of the following expression becomes minimum is used:

$$\mu(P) = \frac{P}{f(P)}.$$

8. An imaging device comprising:
a computer that calculates calibration coefficient a by comparing a plurality of pieces of image data obtained by imaging one spatial brightness distribution surface for different exposure times, and that obtains corrected image data based on calibration coefficient a;
wherein the computer obtains corrected image data I'(P) from the original image data I(P) by use of the following expression:

$$I'(P) = \frac{I(P)}{1 - aI(P)}.$$

9. The imaging device according to claim 8, wherein k is an exposure time ratio $P_n$ is the nth object point brightness in ascending order, $f(P_n)$ is an output brightness of first image data corresponding to the object point brightness, and $f(kP_n)$ is an output brightness of second image data corresponding to the object point brightness, computer obtains an output function f(P) of the original image data based on the following expressions:

$$R_{n-1} = \frac{f(kP_{n-1})}{kf(P_{n-1})}$$

$$f(P_n) = \frac{kP_{n-1} - P_n + kR_{n-1}(P_n - P_{n-1})}{(k-1)P_{n-1}} f(P_{n-1})$$

and the computer obtains a calibration factor a as an average value of the following expression:

$$\frac{1}{f(P)} - \frac{1}{P}.$$

10. The imaging device according to claim 8, wherein k is an exposure time ratio, $P_n$ is an n-th object point brightness in ascending order, $f(P_n)$ is an output brightness of first image data corresponding to the object point brightness, and $f(kP_n)$ is an output brightness of second image data corresponding to the object point brightness, computer that obtains an output function f(P) of the original image data based on the following expressions:

$$R_{n-1} = \frac{f(kP_{n-1})}{kf(P_{n-1})}$$

$$f(P_n) = \frac{kP_{n-1} - P_n + kR_{n-1}(P_n - P_{n-1})}{(k-1)P_{n-1}} f(P_{n-1})$$

and the computer obtains a calibration coefficient a as an approximate gradient of the following expression:

$$\mu(P) = \frac{P}{f(P)}$$

\* \* \* \* \*